T. H. RUSH.
STOP MOTION FOR LOOMS.
APPLICATION FILED MAY 3, 1916.

1,253,632.

Patented Jan. 15, 1918.
6 SHEETS—SHEET 3.

Inventor.
Theodore H. Rush
by his Attorneys.
Howson & Howson.

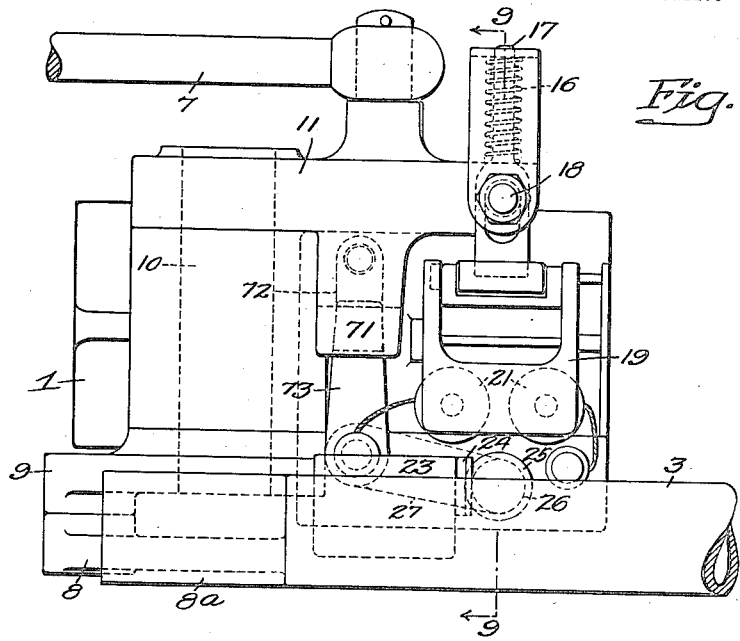
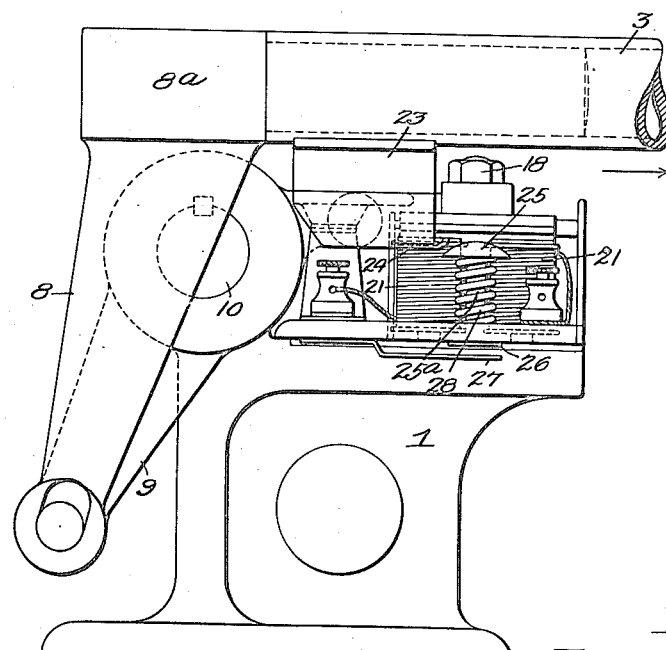

T. H. RUSH.
STOP MOTION FOR LOOMS.
APPLICATION FILED MAY 3, 1916.

1,253,632.

Patented Jan. 15, 1918.
6 SHEETS—SHEET 5.

Inventor-
Theodore H. Rush
by his Attorneys
Howson & Howson

T. H. RUSH.
STOP MOTION FOR LOOMS.
APPLICATION FILED MAY 3, 1916.

1,253,632.

Patented Jan. 15, 1918.
6 SHEETS—SHEET 6.

Inventor
Theodore H. Rush
by his Attorneys
Howson & Howson

UNITED STATES PATENT OFFICE.

THEODORE H. RUSH, OF BLOOMSBURG, PENNSYLVANIA, ASSIGNOR TO JAMES MAGEE, 2D, OF BLOOMSBURG, PENNSYLVANIA.

STOP-MOTION FOR LOOMS.

1,253,632.  Specification of Letters Patent.  Patented Jan. 15, 1918.

Application filed May 3, 1916. Serial No. 95,084.

*To all whom it may concern:*

Be it known that I, THEODORE H. RUSH, a citizen of the United States, residing in Bloomsburg, Columbia county, Pennsylvania, have invented Stop-Motions for Looms, of which the following is a specification.

One object of this invention is to provide relatively simple and reliable means for automatically stopping a loom whenever the filling becomes slack to more than a predetermined extent or when it breaks;—the arrangement of parts being such that the stoppage of the machine follows so quickly upon the breakage or slacking of said filling that it is not necessary to turn back any part of the loom before again starting it, it being possible to thus avoid the mark which would otherwise be made in the fabric as a result of such backward movement.

Another object of the invention is to provide electromagnetic controlling means for looms which shall include a circuit whose continuity is controlled by the filling, the arrangement being such that the slacking or breakage of said filling at either side of the loom shall cause operation of said controlling means to cause the immediate stoppage of said loom.

It is also desired to provide a loom-controlling device which shall include a normally closed switch or switches periodically opened by the filling, together with other means for periodically closing another switch or switches in the same circuit while said first switches are held open, and controlling mechanism so arranged as to cause stoppage of the loom in case the filling fails to open the first switch or switches at the predetermined time or times.

I further desire to provide a stop motion for looms which in addition to its main function of causing stoppage of the loom when the filling breaks or becomes slack, shall also serve to take up the slack of said filling to a predetermined extent after each shot of the shuttle, thus preventing objectionable loops or knots and resulting in the formation of a perfect selvage and smooth back on the fabric produced.

These objects and other advantageous ends I secure as hereinafter set forth, reference being had to the accompanying drawings, in which, Figure 1 is a plan partly in section illustrating a part of a loom with my invention applied thereto;

Figs. 6 and 7 are respectively a plan and a side elevation of the shipper rod controlling means;

Figs. 10 and 11 are respectively a plan and a longitudinal vertical section of one of the filling fingers;

Fig. 12 is a fragmentary front elevation of the second filling finger;

Fig. 13 is a section on the line 13—13, Fig. 12;

Figure 1:
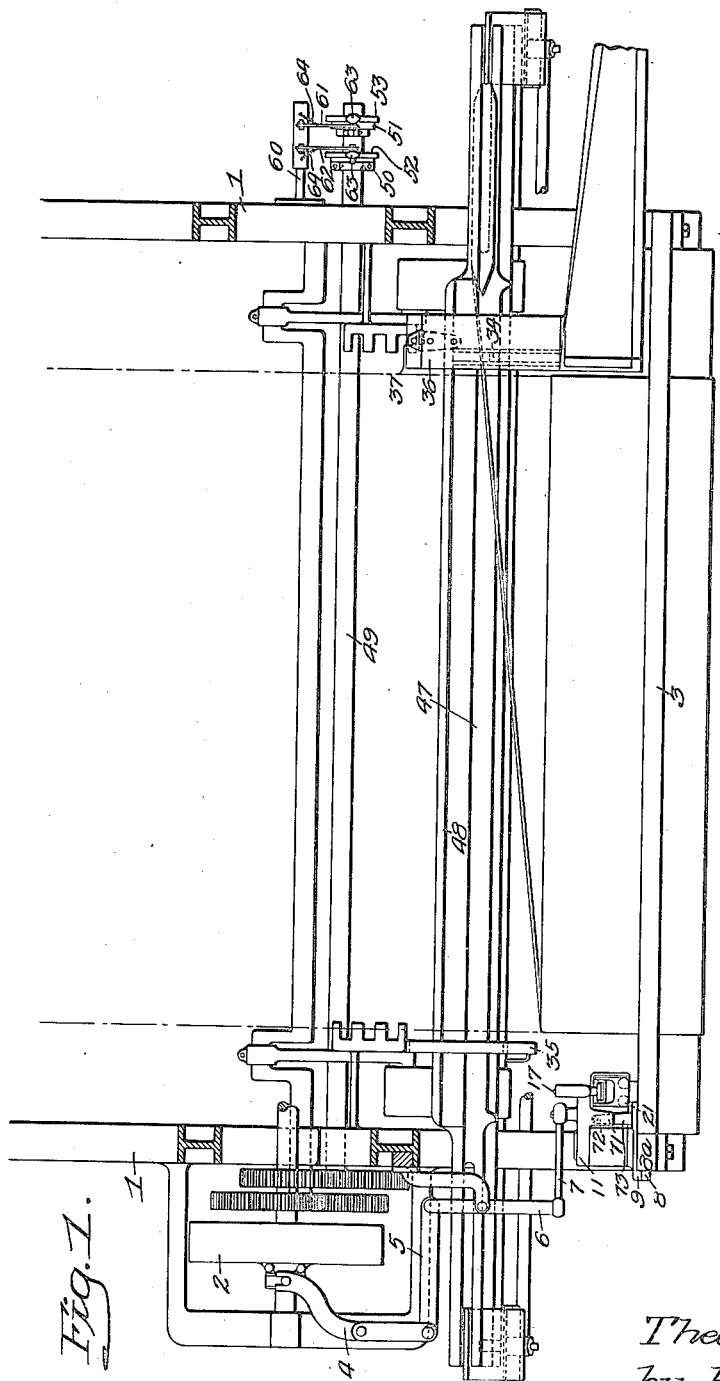
Figure 2:
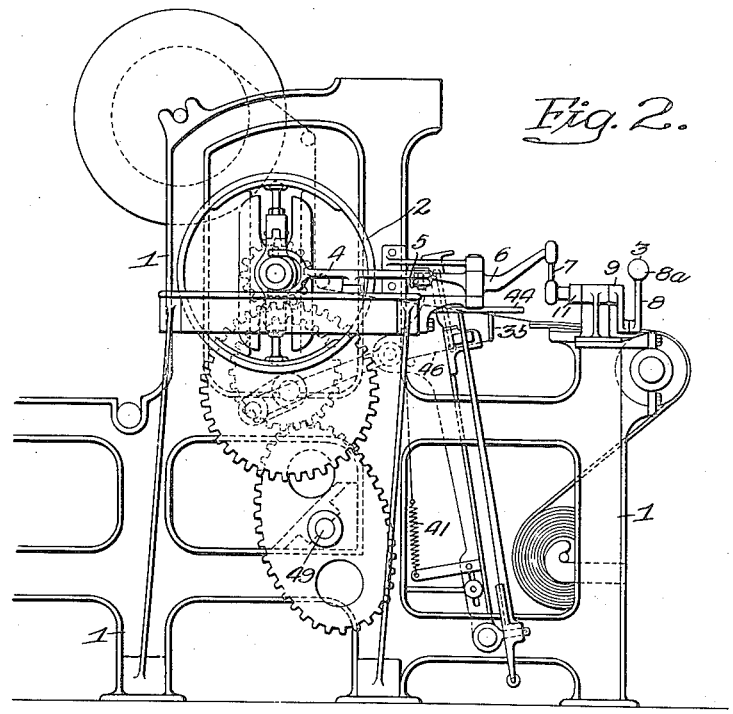
Fig. 2 is an elevation of one end of the loom shown in Fig. 1.
Figure 3:
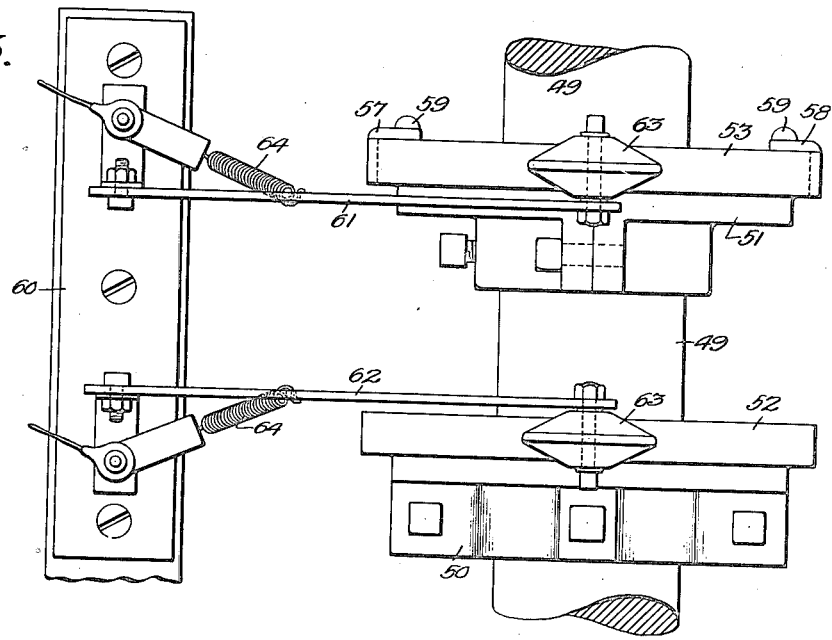
Figs. 3 and 4 are respectively a plan and a side elevation, partly in section, showing the construction of my preferred form of rotary switches whereby the controlling circuit is periodically closed.
Figure 5:
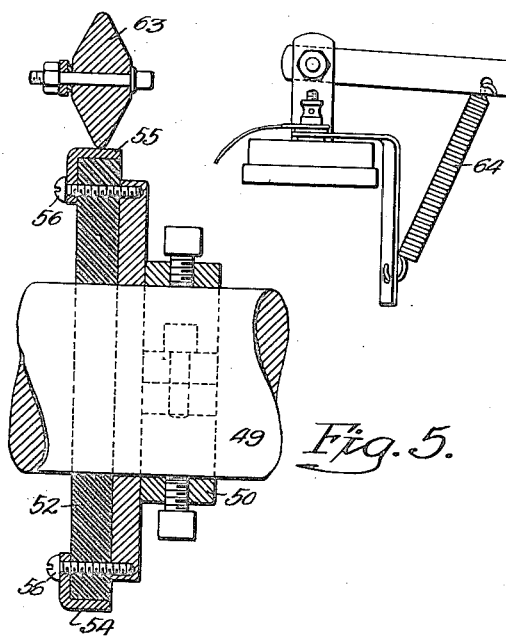
Fig. 5 is a vertical section on the line 5—5, Fig. 4.
Figure 4:
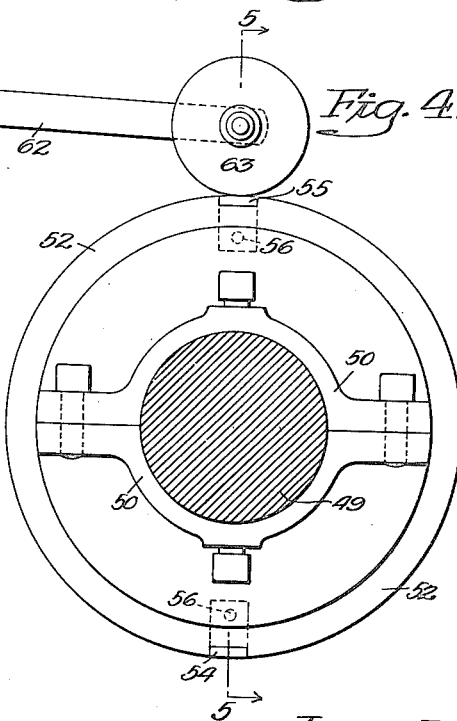

In the above drawings 1 represents the supporting frame of a loom which, while it may be of any desired or suitable construction, is illustrated in the present instance as of the type employed in the manufacture of rugs or carpets. Power for driving this loom is delivered through a clutch 2 whose operation may be controlled from a shipper bar 3 of the well known construction. Said bar is connected to the clutch through a lever 4, a link 5, a lever 6 and a second link 7, which is pivotally attached to an arm 11 on a spindle 10, the latter having also fixed to it a second arm 9 pivoted to an arm 8. This last arm has a head 8$^a$ with an extension slidably entering the end of the shipper bar 3 which is usually tubular. As shown in Fig. 6, the link 7 is journaled on a stud projecting from the arm 11 which may be held in a position to cause the clutch 2 to transmit power to the loom, by means of an electro-magnetic latch 12 designed to coöp- erate with a roller 13 rotatably mounted between a pair of arms 14 pivoted to the frame and held toward it by a spring 15.

The latch is normally pressed toward the roller by a spring 16 acting on its stem 17 and its body portion is slotted for the reception of a bolt 18 mounted in the frame whereby it is held in place and its movement is properly limited. The roller 13 is normally prevented from moving away from the latch 12 by one end of a lever 19 whose opposite end constitutes the armature of a pair of magnet coils 21;—the arrangement being such that when said coils are energized, the resulting movement of said armature toward them releases the roller, which is then free to permit passage by it of the latch 12 and of the upward movement of the arm 11 under the action of the springs or other automatic releasing means of the clutch. The spindle 10 is thus free to turn through an angle sufficient to give the link 7 such movement as will result in the release of the clutch 2.

Figure 8:
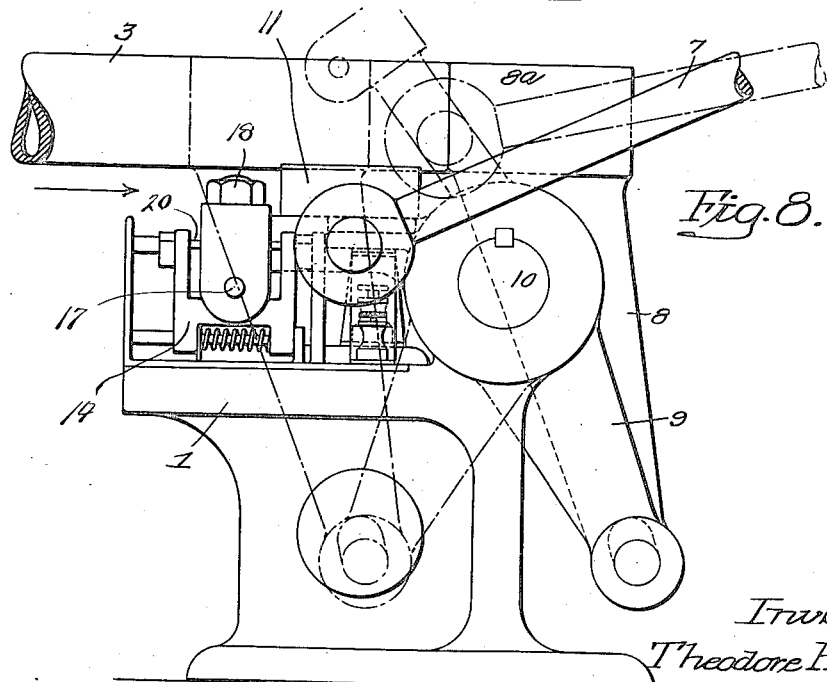
Fig. 8 is an elevation similar to Fig. 7, but showing the opposite side of the device.

The arm 11 also has a projecting lug 71 designed to engage a spring contact 72 as said arm is being moved to the positions shown in Figs. 7 and 8, and force said contact into electrical engagement with a second spring contact 73 which with it constitutes a cut out switch 70 and is mounted on, but insulated from, a suitable part of the frame 1.

Also carried by the frame 1 adjacent the magnet coils 21 is a switch designed to be operated by movement of the shipper bar 3, which for this purpose has mounted on it a downwardly projecting arm 23 carrying a shoe 24 designed to engage and force down the head 25 of a spindle 25ᵃ so as to complete the circuit between a pair of contacts 26 and 27 mounted on a plate of insulating material. The first of these is grounded on the frame of the loom while the second is connected to one terminal of the coils 21;—the second terminal of the latter being connected to a battery 29 or other source of current.

Figure 14:
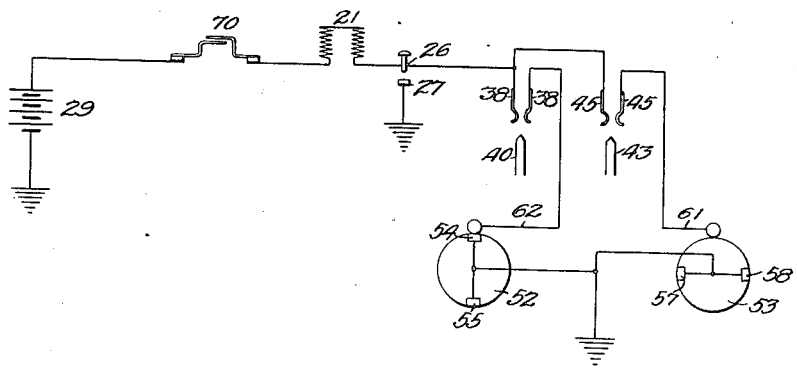
Fig. 14 is a diagram of the electrical connections of the apparatus forming part of my invention.

The second terminal of the current source is grounded on the frame of the machine, and there is also included in the same circuit with the magnet coils 21, a pair of filling-controlled switches 38—40 and 43—45, and a pair of rotary switches 54—62 and 57—61;—it being noted that the rotary switch 54—62 is in series with the filling switch 38—40 while the rotary switch 57—61 is in series with the switch 43—45. While one of the terminals of the switch 26—27 is connected to the circuit as indicated in Fig. 14, the other terminal is suitably grounded, so that its closure will short circuit the magnet coils 21 through the battery or other current source 29 and cause them to attract their armature 20.

At the sides of the loom, preferably to the rear of the breast beam, I mount two slidable filling fingers 34 and 35 of the construction shown in Figs. 10 to 13 inclusive. The first of these fingers, illustrated in Figs. 10 and 11, is slidably guided on a supporting plate 36 connected to the frame through a hinge 37 so as to be free to swing upwardly if necessary and supported so that it normally lies in a substantially horizontal plane. Fixed to this plate is a body of insulating material 39 carrying a pair of spring contacts 38 in position to be electrically connected by a slidably mounted contact 40 carried by or attached to the filling finger 34. This contact 40 tends to move into engagement with the contacts 38 under the action of a spring connected to it through a cord or cable 42.

The second filling finger 35 which is likewise slidable has attached to it a plate of insulation carrying a contact 43 which with it is guided on a plate 44 so as to be capable of electrically connecting a pair of fixed contacts 45 under the force of a spring 41, transmitted through a cord or cable 46. In both cases the filling fingers are mounted at a level such that a horizontal plane including the line of movement of the shuttle or the plane of the warp, passes substantially centrally through them. As shown in Fig. 1, said fingers are mounted immediately adjacent the opposite edges of the warp, so that upon the forward movement of the lay 47, the reed 48 in beating up the filling or other yarn leading from the shuttle, necessarily causes the portion of said yarn nearest said shuttle to engage and draw forward the filling finger adjacent which it passes together with the switch member thereon. It is noted that said fingers are so mounted as to have a movement in excess of that required to open their switches;—for example, in one case a movement of the finger of about one inch will cause opening of its switch and said finger is free to thereafter move two inches farther, so that a certain amount of slack is automatically taken up before the switches controlled by the fingers are allowed to open when the lay moves forward.

On any suitably and properly timed rotary element of the loom, such as the shaft 49, I mount a pair of flanged collars 50 and 51 and bolt to them insulating disks 52 and 53 respectively. The first of these disks has fixed to its periphery a pair of metallic contacts 54 and 55, preferably of angular section and in electrical connection with the flanged collar thereof through a pair of holding screws 56. Similarly the insulating disk 53 carries a second pair of angular contacts 57 and 58 electrically connected by screws 59 to the shaft 49 through a collar 51;—it being noted that both pairs of these contacts have their contact surfaces lying flush with the circular edges of the insulating disks on which they are respectively carried and that the contacts 57 are disposed on lines radial to the shaft 49, at right angles to the radial line passing through the contacts 54 and 55.

On a suitable bracket 60 carried by the frame of the loom, I pivotally mount two arms 61 and 62 in such positions that rollers 63 carried thereby will normally rest upon the edges of the two disks 52 and 53 respectively. These arms 61 and 62 are respectively drawn down by springs 64 so that their contact rollers are maintained in engagement with said edges, and it is noted that said rollers are sharp edged so that they have but a relatively narrow edge bearing upon their respective disks.

As shown in Fig. 14, one terminal of the battery 29 or other current source is grounded on the frame of the loom while the other terminal is connected through the cut out switch 70 to one terminal of the magnet coil 21. The second terminal of this coil is connected to one of each of the two contacts 38 and 45 of the filling-controlled switches, while the other ones of these pairs of contacts are respectively connected to the arms 62 and 61 of the rotary switches. Both pairs of contacts of these switches are grounded on the shaft 49 and hence are in electrical connection with the metallic frame work of the loom.

Under conditions of use after each shot or movement of the shuttle, the forward movement of the lay causes the filling to draw forward one or the other of the filling fingers 34 or 35, if said filling is not broken or if it has the predetermined tension, the movement of the fingers varying with the amount of slack of said filling, which is taken up in moving said fingers for a greater or less distance. Consequently while the switch 43—45 in one case is closed, the switch 38—40 is moved by the filling into its open position, and the two rotary switches are so timed that when this action occurs the switch 56—63 has its roller 63 on the insulating portion of the disk 52. The other disk 52 however, is so positioned that immediately after the switch 38—40 is opened, its roller 63 electrically engages one or the other of its contacts 54 or 55 although the circuit including the magnet coils remains open because of the open condition of said switch 38—40.

If, however, the filling should break or for some reason should be slack, beyond the amount which could be taken up by the filling finger 34, this latter would not be moved sufficiently to open the switch 38—40 upon the next forward movement of the lay, and as a consequence, when one of the contacts 57 or 58 is engaged by the roller 63 on the arm 61, the circuit would be completed from the current source through the coils 21, switch 38—40, and rotary switch 54—62, through the shaft 49 and the frame of the loom back to the current source. The energization of the coils 21 would thereupon attract the armature 20 and release the roller 13 carried by the arms 14, thus permitting the arm 11 with the shaft 10 to swing upwardly into the position indicated in dotted lines in Fig. 8, and allowing the clutch 2 to move to its released position.

Figure 9:
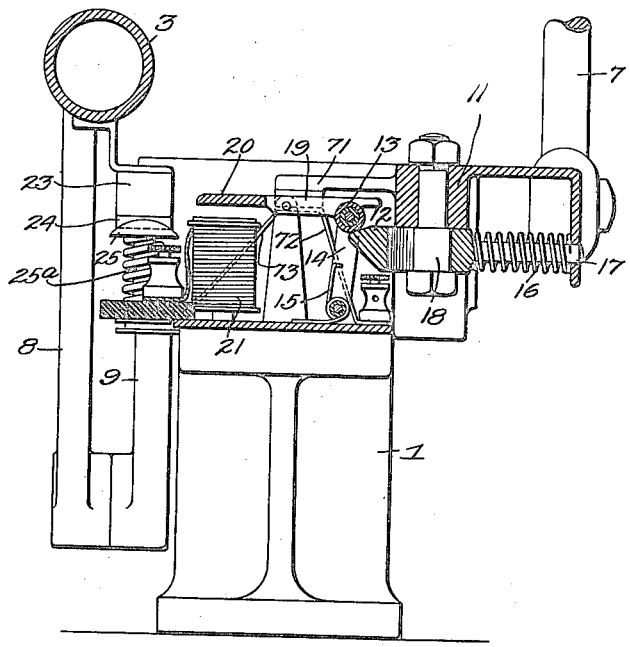
Fig. 9 is a vertical section on the line 9—9, Fig. 6.

As a result of this movement of the arm 11, the opening of the clutch 2 is practically instantaneous and by suitable braking means the loom is stopped in the shortest possible time after an undue slacking or breakage of the filling occurs, making it possible to take up the slack or splice the filling without the necessity for turning back the various parts and thus causing a mark on the rug or carpet which would materially lower its value. When the arm 11 moves up in causing release of the clutch as noted, the contacts 72 and 73 of the cut out switch 70 are allowed to disengage each other so that the circuit of the battery 29 is opened and no continued flow of current can occur. In order to again start the loom, the shipper bar 3 is moved in the direction of the arrow, Fig. 8, causing the arm 11 to swing downwardly until the latch 12, after moving away from the roller 13 against the action of the spring 16, springs out into the position shown in Fig. 9, under said roller, where it is held by reason of the engagement of the latter by the armature 19. The contacts 72—73 of the stop switch are thus again brought into engagement, so that the various parts are in their operative positions and the clutch being closed, the loom may be again put in service.

If it is desired to manually stop the loom while it is operating, this may be conveniently accomplished by moving the shipper bar 3 independently of the head 8ᵃ in the direction of the arrow in Fig. 7, thus bringing the contact 27 into engagement with the spring supported contact member 26 and causing energization of the magnet windings 21. This serves to free the latch 12 and arm 11 and also releases the clutch 2 as above indicated.

The same series of operations as that above described in connection with the filling finger 34 occurs with the finger 35 upon the next forward movement of the lay after that actuating said first finger, since if the filling or other yarn is still at the proper tension, the switch 43—45 is opened by reason of the drawing forward of the finger 35 just before the corresponding rotary switch 57—61 is closed by reason of the engagement of its roller 63 with one of the contacts on its insulating disk. If, however, the filling has more than a predetermined slack or is broken, said switch 43—45 is not opened at the proper time and the circuit including the magnet coils 21 is completed by the rotary switch, so that as before, the clutch 2 is released and the loom stopped before damage or injurious marking can be caused to the rug, carpet or other fabric being woven.

Figure 15:
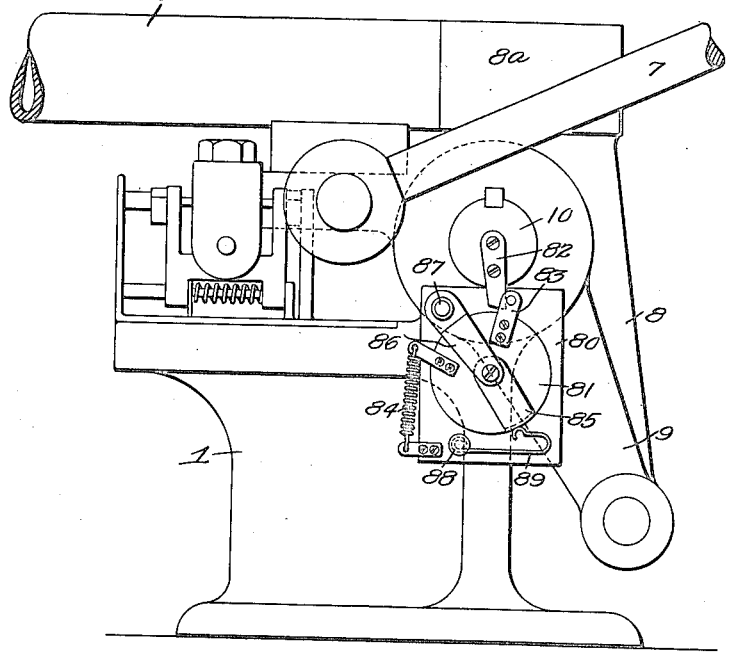
Fig. 15 is a side elevation of a modified arrangement of the controlling switch and its associated parts.

Obviously other suitable forms of filling-controlled and rotary switches may be employed without departing from my invention, and likewise the cut-out switch may be constructed in other ways, such for example as is shown in Fig. 15, where I mount adjacent one end of the shaft 10 an insulating plate 80 carrying a rotary disk 81 of insulating material. On the end of the shaft 10 I mount a small projecting lug or arm 82 in position to strike a pin on the end of a second arm 83 projecting from the insulating disk 81 so as to turn the latter or permit it to turn under the action of a spring 84 whenever the shipper bar 3 and the arms 8 and 9 associated therewith are moved. The insulating disk 81 carries a contact in the form of a piece of strip material 85 extending from its periphery to its center where it is electrically connected to a fixed contact strip 86 extending from a binding post 87 carried by the base plate 80 to the middle of the circular disk 81. A second binding post 88 is likewise mounted on the base 80 and has connected to it a spring contact 89 placed to operate on the periphery of the disk 81, so as to be capable of engaging the contact piece 85 when said disk is turned into the proper position.

As a result of this construction, the spring 84 at all times holds the pin on the arm 83 against the arm 82 and when the shipper bar 3 occupies the position shown with the loom in operation, the fixed and movable contacts 85 and 89 are engaged. When, however, the arm 11 is released to stop the loom, the spindle 10 is likewise turned through the arms 8 and 9 and the spring 84 thereupon causes such an angular turning of the disk 81 as will turn the contact 85 thereon out of engagement with the contact 89. The circuit through the current source and magnet coils 21 is thus broken as before described, so that there is no unnecessary flow of current.

Obviously if desired a single filling controlled switch may be used instead of the two such fingers illustrated, but I have found the best results are secured by the arrangement described and shown.

I claim:—

1. A stop motion for a loom consisting of a switch placed to be periodically opened by the filling on the beat up of the lay; a second switch periodically closed at the time the first switch would normally be opened; a source of current and an electro-magnet in circuit with said switches; and loom stopping means controlled by said magnet.

2. A stop motion for a loom consisting of a plurality of circuits including switches mounted to be periodically opened by the filling on the beat up of the lay; a source of current; an electro-magnet; means in circuit with the respective switches, the magnet and the current source for closing the respective circuits at the time when said switches would normally be opened by the filling; and loom stopping means controlled by said electro-magnet.

3. A stop motion for a loom consisting of a pair of switches placed at opposite sides of the loom in positions to be alternately opened by the filling on the beat up of the lay; branch circuits including said switches; a source of current; an electro-magnet; and means for completing the circuit including said switches, the source, the branch circuits and the electro-magnet at the time when said switches would normally be opened by the filling; and loom stopping means controlled by the magnet.

4. A stop motion for a loom consisting of a member moved by the filling when this is beaten up; a switch having its movable element connected to said member so as to be actuated thereby; a second switch actuated from a moving part of the loom so as to be periodically closed; a source of current and an electro-magnet in circuit with said switches; and loom governing means controlled by said magnet.

5. The combination in a loom of members mounted at opposite sides thereof in positions to be alternately moved by the filling when this is beaten up; normally closed switches connected to said members and opened by movement thereof caused by the filling; a source of current; an electro-magnet; means in circuit with said magnet, the source and said switches for completing their circuits respectively at the time when said switches would normally be open; and loom stopping means governed by said electro-magnet.

6. The combination in a stop motion for looms of a normally closed filling-controlled switch; a rotary switch in timed relation to the loom; a source of current and an electro-magnet in circuit with said switches; and loom stopping means governed by said magnet.

7. A stop motion for a loom consisting of a switch placed to be periodically opened by the filling; a second switch periodically closed at the time the first switch should normally be opened; a source of current and an electro-magnet in circuit with said switches; loom stopping means controlled by said magnet; with means for causing energization of said electro-magnet at will.

8. A stop motion for a loom consisting of a switch placed to be periodically opened by the filling; a second switch periodically closed at the time the first switch should normally be opened; a source of current and an electro-magnet in circuit with said switches; loom stopping means controlled by said magnet; with a switch controlled by the shipper bar of the loom and connected to cause energization of the magnet independently of said other switches.

9. A stop motion for a loom consisting of a switch placed to be periodically opened by the filling; a second switch periodically closed at the time the first switch should normally be opened; a source of current and an electro-magnet in circuit with said switches; loom stopping means controlled by said magnet; with means for automatically opening the circuit of said apparatus after the magnet is energized to stop the loom.

10. The combination in a stop motion for a loom of two normally closed, filling opened switches; two switches periodically actuated from the loom and respectively in circuit with said first switches; a current source; an electro-magnet connected to be energized whenever one of the filling controlled switches and its corresponding loom-actuated switch are closed at the same time; and loom stopping means controlled by said magnet.

11. The combination in a stop motion for looms of a normally closed switch periodically opened by the filling on the beat up of the lay; an electro-magnet; a current source; and a second switch in circuit with said first switch, the source and the magnet, connected to be periodically closed during the time that the filling would normally open the first switch; loom stopping means governed by the electro-magnet; and a third switch in circuit with said apparatus in position to be opened by the loom stopping mechanism.

12. The combination of a loom; a clutch through which power is transmitted thereto; means including a latch for normally retaining the clutch in a closed position; an electro-magnet for releasing said latch; a normally closed, filling-opened switch in circuit with the magnet; and a second switch connected to be periodically closed by the operation of the loom during the time that the filling would normally open said first switch.

13. The combination with a loom of spring actuated fingers mounted to be engaged by the filling when this is beaten up; loom stopping means including switches alternately actuated by said fingers respectively; with other mechanically operated switches respectively in circuit with said first switches and arranged to be normally closed when the latter are opened.

14. The combination with a loom of a finger periodically moved by the filling when this is beaten up; and a switch including a slidable contact connected to said finger for stopping the loom when the finger is moved less than a predetermined distance by the filling.

15. The combination in a loom of two filling fingers respectively on opposite sides thereof mounted in positions to be alternately moved by the filling as this is beaten up; with means controlled by either finger for stopping the loom in the event of such finger being moved by the filling less than a predetermined distance, said means including switches successively operated by said fingers, and other switches in circuit with said first switches and normally closed after the latter have been opened by their fingers.

16. The combination with a loom of a movably mounted structure; a switch thereon; a slidably mounted filling actuated finger connected to normally open said switch when the filling is beaten up; and means controlled by said switch for stopping the loom when the movement of the finger is insufficient to open the switch.

17. The combination in a loom of a hinged plate mounted adjacent the path of the shuttle and free to be swung away from the same; a filling finger movably mounted on said plate in position to be accessible when the latter is swung away from the shuttle path; a switch controlled by said finger; and loom stopping means connected to put the loom out of action when the filling finger is moved a distance insufficient to open the switch.

THEODORE H. RUSH.